United States Patent [19]

Kowalczyk

[11] Patent Number: 4,574,931

[45] Date of Patent: Mar. 11, 1986

[54] MINIMUM PURGE VOLUME HYDRAULIC CLUTCH ACTUATOR

[75] Inventor: Thomas A. Kowalczyk, Pittsfield, Mass.

[73] Assignee: General Electric Company, Fairfield, Conn.

[21] Appl. No.: 468,638

[22] Filed: Feb. 22, 1983

[51] Int. Cl.[4] .................................................. F16D 25/061
[52] U.S. Cl. ........................... 192/106 F; 188/72.4; 91/31; 91/443
[58] Field of Search ............. 192/106 F, 86, 85 AA, 192/59; 91/4, 31, 443; 188/72.4; 303/57

[56] References Cited

U.S. PATENT DOCUMENTS

| | | | |
|---|---|---|---|
| 2,178,017 | 10/1939 | Fedden et al. | 192/86 |
| 2,297,480 | 9/1942 | Kratzman. | |
| 2,518,016 | 8/1950 | Johnson et al. | 192/86 X |
| 2,633,218 | 3/1953 | Pielstick | 192/86 |
| 2,710,086 | 6/1955 | Stahl | 192/86 X |
| 2,954,040 | 9/1960 | Bolster | 192/106 F |
| 3,360,087 | 12/1967 | Hilbert | 192/85 |
| 3,415,345 | 12/1968 | Cadiou | 192/86 X |
| 3,814,226 | 6/1974 | White | 192/ |
| 3,815,698 | 6/1974 | Reed | 180/ |
| 3,863,746 | 2/1975 | Schulz | 192/86 X |
| 4,036,344 | 7/1977 | Nolan | 192/48.3 |
| 4,333,552 | 6/1982 | LaMarche | 192/3.29 |
| 4,345,488 | 8/1982 | Reed | 74/682 |

FOREIGN PATENT DOCUMENTS 1476722 6/1977 United Kingdom.

Primary Examiner—Rodney H. Bonck
Assistant Examiner—Richard M. Lorence
Attorney, Agent, or Firm—Francis K. Richwine; Bailin L. Kuch

[57] ABSTRACT

An improved disk clutch structure in which a hydraulic piston provides the force to cause frictional contact between clutch plates. The invention resides in the use of a drain conduit and pressure responsive drain valve in combination with a vent conduit and a pressure responsive vent valve to remove hydraulic fluid from the hydraulic cylinder on inactivation of the clutch with the location of conduits being such that removal of the fluid from the cylinder is assisted by centrifugal forces created by moving clutch parts and such that only the hydraulic cylinder is evacuated.

5 Claims, 2 Drawing Figures

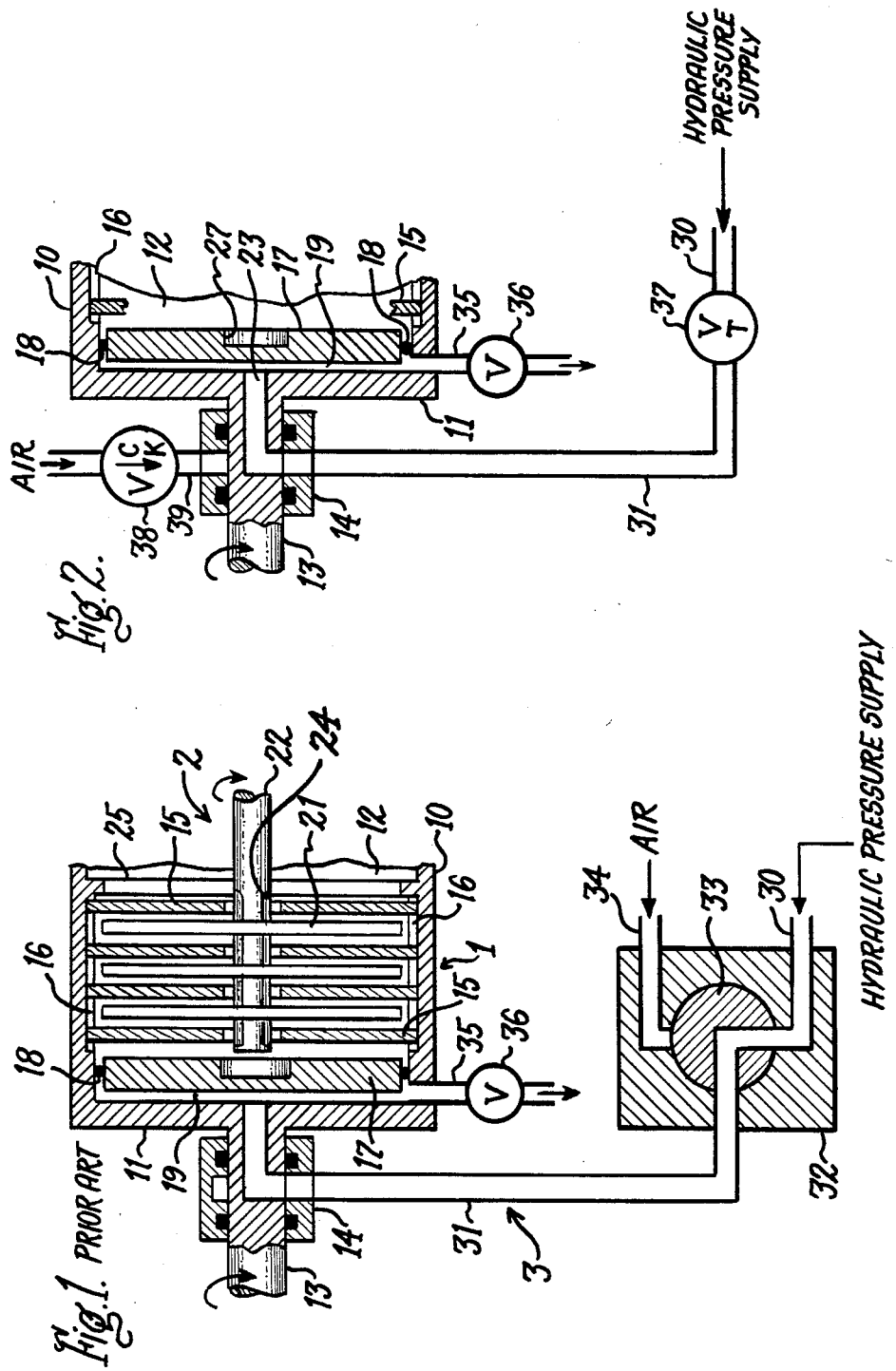

MINIMUM PURGE VOLUME HYDRAULIC CLUTCH ACTUATOR

BACKGROUND OF THE INVENTION

1. Field of the Invention

This invention pertains to rotating clutches which are activated by means of a hydraulically actuated pressure plate to cause frictional contact between plates to transfer energy and is applicable to both multiplate clutches and single plate clutches used in power transmission systems.

2. Background Art

There are many types of actuation systems for rotating disk clutches many of which include the use of a pressure plate. In the case of some multiplate disk clutches the pressure plate is moved against a first plate of a series of plates to cause frictional contact between adjoining plates where alternate plates are keyed to two different i.e., driving and driven members. Movement or actuation of a pressure plate can be mechanical, hydraulic or electrical. The present invention pertains to the type of clutch in which a pressure plate is activated hydraulically, as for example U.S. Pat. No. 4,036,344 to Nolan, or Hilpert U.S. Pat. No. 3,360,087 and White U.S. Pat. No. 3,814,226 cited in Nolan. Although the Nolan patent is directed to a two stage or multiple element clutch as a means for reducing drag when the clutch is not operating, the portion which is pertinent to the present invention is the application of hydraulic fluid under pressure to chamber 55 to force piston or pressure plate 48 to move axially to press plates 26 and 34 together and against stop 36 so as to cause the driven member 10 to which alternate plates 26 are keyed to be driven by driving member 28 to which alternate plates 34 are keyed. Nolan's hydraulic activation system to deliver hydraulic pressure through passageway 56 and conversely to relieve that pressure for inactivation of the clutch is not shown but the return spring 64 used by Nolan for clutch disengagement is shown. U.S. Pat. No. 4,333,552 to LaMarche is directed to a more intricate, sophisticated arrangement for operation of a pressure relief valve in hydraulically actuated clutches.

Other more simple systems, as for example the references cited in Nolan, contemplate the direct connection of driven and driving members by hydraulically forcing a rotating or rotatable element against a single plate or a stack of plates for frictional contact. In other systems, and particularly those not using spring biasing for disengagement, clutch actuation and release can be degraded by actions and reactions within the hydraulic system. For example, the viscous action of hydraulic fluid remaining in the system on clutch release can maintain a force on the driven member which would interfere with gear engagement in an attached transmission. Hydraulic actuators are sometimes provided with relief systems to drain or partially drain the hydraulic pressure chamber. Relief systems can, in turn, create a delay in actuation when a substantial volume of hydraulic fluid is necessary to fill the actuation chamber prior to causing a movement of the pressure plate in response to hydraulic pressure.

SUMMARY OF THE INVENTION

This invention pertains specifically to the hydraulic system and clutch plate actuator portion of a hydraulically operated clutch, provides for a minimum time interval in the accomplishment of both clutch engagement and clutch release and is of particular value in a system not using a spring or other assistances for pressure release. The invention provides for the evacuation or bleeding and refilling of a minimum of volume of a hydraulic actuating system on release and reactivation of the clutch by use of cooperating valves proximate to the pressure chamber and separate from the actuator valve.

BRIEF DESCRIPTION OF THE DRAWINGS

FIG. 1 is an illustration, partially in section of a multidisk rotating clutch with a schematic representation of a hydraulic actuation and release system representative of the prior art.

FIG. 2 is an illustration, partly in section, of the improved hydraulic actuation system of the present invention as applied to the clutch illustrated in FIG. 1.

DETAILED DESCRIPTION

In General

Rotating hydraulic piston clutch systems to which this invention are applicable are quite often made up of a series or stack of circular clutch plates within a housing wherein alternate plates are keyed to a central shaft with the remaining plates being keyed to the housing in combination with a pressure plate, which is either one of the plates in the stack or a separate pressure plate. The pressure plate defines with the housing a variable capacity cylinder having communication with a hydraulic pressure supply. A valved hydraulic pressure supply and actuator system provides hydraulic pressure through a conduit to the variable capacity chamber to force the pressure plate to move axially and to force the clutch plates together in cooperation with a stop or other device for limiting plate movement so as to impart the motion of the driving member to the driven member. The pressure plate may be splined to one moving member or freely rotatable. It is immaterial whether the shaft to which one set of plates is keyed or the housing to which the other set is keyed is the driving or driven member. FIG. 1 of the drawings represents a composite of systems commonly used in the art and includes a commonly used method of relieving the hydraulic pressure to permit the clutch to disengage.

In the prior art composite schematic representation of FIG. 1, the clutch is made up of a rotatable cylindrical housing 1, an axial shaft supported structure 2, and a hydraulic actuator system 3, wherein either the cylindrical housing or the axial shaft can be the driving member and the other the driven member. The cylindrical housing 1 includes cylinder wall 10 and end wall 11 together defining a clutch cylinder 12, a shaft 13 attached to end wall 11 and a bearing structure 14 which supports the cylinder 12 for rotation. For convenience of explanation, the shaft 13 will be referred to as the input shaft or driving member and shaft 22 as the output shaft. As an alternate, cylindrical wall 10 and end wall 11 could be separate elements joined by a bearing interface located, for example, radially opposite to the end of shaft 22 so that shaft 13 would remain stationary with input drive being furnished to cylindrical wall 10 with no effect on the elements constituting the invention. One or more input plates 15 shown in cross section in FIG. 1 are located within the clutch cylinder and are keyed to cylinder wall 10 by means of projections on the plates located in key slots 16 in the cylinder wall. The clutch cylinder also contains one or more output plates 21, shown in elevation, keyed to shaft 22 by means of projections fitted to key slots 24 in the shaft. Also located within the clutch cylinder, and proximate the end illustrated, is a piston or pressure plate 17 which defines, with end wall 11, portions of the cylinder wall 10 and the pressure seal device 18, a hydraulic pressure chamber 19. The clutch is activated by the insertion of hydraulic fluid under pressure through the actuator system 3 into chamber 19 so as to force the piston 17 away from end wall 11, overriding the end of shaft 22, and forcing plates 15 and 21 together against stop 25. This causes any rotational motion of shaft 13 or as noted an alternatively separated cylinder 10 to be transferred to shaft 22 or vice versa. In any implementation of the clutch illustrated in FIG. 1, the plate clearances, the location of stop 25 and the depth of recessed portion 27 of piston 17 should permit the stack of clutch plates to be wedged between piston 17 and stop 25 while still allowing for a clearance between the end of shaft 22 and piston 17 to obtain maximum plate contact.

Hydraulic fluid under pressure is injected into the pressure chamber 19 by means of the hydraulic actuator system 3 which includes a hydraulic pressure supply line 30, an apply valve structure 32 and a feeder line 31 communicating between the apply valve structure and pressure chamber 19. In the prior art as generalized in FIG. 1, provision is normally made within the apply or actuation valve structure 32 to alternatively connect the feeder line 31 to a vent tube 34 as, for example, by the valve 33. With the apply valve 32 set so as to cause feeder line 31 to be exposed to the hydraulic pressure from supply line 30, pressure chamber 19 is filled with hydraulic fluid under pressure to force piston 17 to move to actuate the clutch.

The clutch cylinder 12 is also provided with a bleed line 35 located in either the cylinder wall 10 or in the end wall 11 at or near the periphery of the clutch cylinder. The purpose of the bleed line 35 which is interdicted by a bleed or drain valve 36 is to facilitate the removal of hydraulic fluid from pressure chamber 19 to permit pressure plate piston 17 to move to release pressure on the plates for inactivation of the clutch. If apply valve 32 were merely set to disconnect feeder line 31 from the hydraulic pressure supply line, the feeder line 31 and pressure chamber 19 would remain filled and pressurized and the clutch would not release. Movement of the apply valve 33 so as to cause feeder line 31 to communicate with the vent 34 relieves the pressure, but in combination with the bleed line and bleed valve 36, not only permits relief of the hydraulic pressure from chamber 19 but permits the hydraulic fluid to drain from the pressure chamber and be replaced by atmospheric air entering through the vent 34. This is made possible by the fact that the appropriate bleed valve 36 is one which is normally open under conditions of atmospheric or slightly higher pressure at the inlet to the chamber 19 but closes in response to the higher pressure applied through valve 32 for actuation of the clutch. This requires, of course, that the threshold or actuation pressure for valve 36 be established at a pressure slightly higher than the pressure occurring in bleed line 35 when feed line 31 is connected to atmosphere, the chamber 19 is full and the clutch mechanism is spinning. It is necessary that the bleed or drain outlet be located peripherally of pressure chamber 19 to remove sufficient fluid from the chamber. Otherwise the rotating motion of the clutch housing and pressure plate piston would force any hydraulic fluid present to the periphery and, under some conditions, would cause continuing centrifugal pressure in the chamber to maintain contact between plates, which if not sufficient to activate the clutch could cause unnecessary plate wear.

The system as illustrated in FIG. 1, however, still has some shortcomings in that a discrete amount of time is required for the draining of the hydraulic fluid when the clutch is inactivated as feeder line 31, and the actuator valve as well as chamber 19 must be evacuated. Moreover, a discrete amount of time is required for the filling of all of the elements, feeder line, valves and the pressure chamber on activation of the clutch as a result of location of the venting arrangement 34 within the apply valve complex as illustrated at 32. This has been common in the art and can be improved on to produce a more effective clutch activation-inactivation system having relatively much shorter delay times.

The Invention

The present invention contemplates an improvement of the hydraulic actuator system used with rotating hydraulic piston clutch systems and is schematically illustrated in FIG. 2 wherein only the novel aspects of this invention as compared to the prior art are shown. The FIG. 2 system would incorporate the same clutch cylinder housing, shaft, disks, pressure plate and bearing structures as illustrated or described with reference to FIG. 1. In FIG. 2, the hydraulic feeder line 31 is supplied from hydraulic pressure supply line 30 by means of a state of the art throttle valve 37 as opposed to the more complex application valve 32 of FIG. 1. In particular, the modification includes an improved venting arrangement or relief valve system based on the use of a check valve 38 attached to the feeder line as close to the clutch pressure chamber as is physically possible as, for example, in a short vent line 39 or if feasible at the aperture 23 as might be accomplished by use of an additional tube within line 31. It would also be feasible to connect vent line 39 directly to aperture 23 in the case of a stationary shaft 13 and end wall 11 as noted previously with respect to a modification in which a rotating cylinder 10 were attached to a stationary end wall 11 by a bearing juncture, with cylinder 10 constituting the input member. The check valve 38 or other relief means, the presence and location of which is the primary characteristic of this invention is responsive to atmospheric pressure and is open to admit atmospheric air except when hydraulic pressure is introduced to the feeder line with the result that the hydraulic pressure chamber 19 will be in a relief condition at all times that throttle valve 37 is not activated. As noted above with respect to the prior art, the design of bleed valve 36 is such that it will remain open until subjected to a hydraulic pressure that is in excess of the pressure created in bleed line 35 by centrifical forces when any fluid (air, oil or hydraulic fluid) at aperture 23 is at or slightly above atmospheric pressure to allow for a safety factor. This arrangement minimizes the time duration for evacuation of pressure chamber 19 on release of the clutch. With location of the feeder line 31 principally below the level of its connection to the pressure chamber, gravitational forces will cause feeder line 31 itself to remain full of hydraulic fluid when the clutch is inactive, thereby minimizing the amount of hydraulic fluid needed to fill the system on activation of the clutch, in turn minimizing the activation time. These time reductions, even though small on an absolute measurement basis, are of substantial value when used with, or as a component in, an automatic transmission type of power drive, particularly synchronous shifting transmissions.

One potential use of the improve hydraulic clutch plate actuator of the present invention is in heavy duty hydromechanical transmissions, as for example, the type disclosed in U.S. Pat. Nos. 3,815,698 and 4,345,488 which are synchronous shifting. In both transmissions, the present invention could be used with the third range clutch.

Although the foregoing invention has been described in the context of a multi-plate clutch using a separate free floating piston actuator wherein the housing of the clutch is connected to the input drive and used to drive an axial output shaft, the invention is as applicable with the input and output reversed and applicable to systems in which the pressure plate piston is also a clutch plate with a friction surface, whether used in a multi- or a single plate clutch.

We claim:

1. In a hydraulically operated rotating disk clutch assembly including:
   a support and housing structure;
   a movable pressure plate forming with the interior of said housing structure a variable volume hydraulic pressure chamber;
   a hydraulic system including
     a hydraulic feed line communicating with said chamber for supplying hydraulic fluid under pressure to cause said pressure plate to move to apply pressure to other clutch elements,
     a source of hydraulic fluid under pressure,
     an apply valve to selectively connect said feed line to said source to apply said clutch assembly, and
     means for relieving said chamber of hydraulic pressure when said apply valve disconnects said source,
   the improvement wherein said means for relieving comprises:
   pressure responsive drain valve means for draining said chamber when open, said drain valve means being closed when exposed to pressure responsive to connection by said apply valve of said feed line to said source, said drain valve means communicating with said chamber near the periphery thereof; and
   pressure responsive relief valve means for admitting air to said chamber when the pressure in said chamber is below atmospheric pressure, said relief valve means connected with said hydraulic system proximate the junction of said feed line and said chamber whereby gravitational forces will maintain hydraulic fluid in said feed line and said apply valve when said relief valve and drain valve means are open.

2. In a hydraulically operated rotating disk clutch assembly including:
   a support and housing structure;
   a movable pressure plate forming with the interior of said housing structure a variable volume hydraulic pressure chamber;
   a hydraulic system including a hydraulic feed line communicating with said chamber for supplying hydraulic fluid under pressure to cause said pressure plate to move to apply pressure to other clutch elements;
   a source of hydraulic fluid under pressure;
   an apply valve to selectively connect said feed line to said source to apply said clutch assembly; and
   means for relieving said chamber of hydraulic pressure when said apply valve disconnects said source;
   the improvement wherein said means for relieving comprises:
   pressure responsive drain valve means for draining said chamber when open, said drain valve means being closed when exposed to pressure responsive to connection by said apply valve of said feed line to said source, said drain valve means communicating with said chamber near the periphery thereof; and
   pressure responsive relief valve means for admitting air to said chamber when the pressure in said chamber is below atmospheric pressure, said relief valve means connected with said hydraulic system proximate the junction of said feed line and said chamber;
   wherein said relief valve means, said feed line and said apply valve are so located with respect to each other and to said chamber that gravitational forces will maintain hydraulic fluid in said feed line and said apply valve when said relief valve and drain valve means are open.

3. The improvement of claim 2 wherein:
   said chamber is cylindrical;
   said pressure plate is a disk which is rotatable about the axis of said cylindrical chamber and said drain valve means communicates with said chamber proximate the rim of said rotatable disk pressure plate when the pressure plate is in the position causing the variable volume chamber to be at minimum volume whereby hydraulic fluid will be expelled from said chamber by cooperation of centrifugal forces created by rotation of said pressure plate and said means for relieving.

4. The improvement of claim 3 wherein:
   said chamber is defined by a cylindrical wall, and end wall and said pressure plate;
   said support and housing structure includes said walls, an input shaft attached to said end wall and a bearing structure supporting said input shaft for rotation about the axis of the shaft;
   said hydraulic feed line enters said chamber through said input shaft; and
   said relief valve means communicates with said chamber by means of a vent line connected to said feed line where it enters said shaft.

5. In a hydraulically operated rotating disk clutch assembly wherein said clutch assembly is applied and released by the selective injection of hydraulic fluid under pressure by an apply valve through a feed line into a variable capacity cylinder to drive a pistonlike clutch pressure plate against other clutch elements, wherein said pressure plate rotates about its axis of translation as a result of motion transmitted by the clutch assembly, wherein there is a pressure release means allowing said hydraulic fluid to escape from said cylinder to reduce hydraulic pressure to permit said pressure plate to move away from said other clutch elements when the clutch is released and wherein centrifugal forces imparted to said hydraulic fluid by rotation of operative clutch elements could limit movement of said pressure plate away from said other clutch elements; the improvement wherein said pressure relief means comprises:
   drain line conduit means communicating between the portion of said cylinder most subject to pressure build-up of hydraulic fluid as a result of centrifugal forces caused by rotation of said pressure plate and other clutch components when said clutch is released and the atmosphere;

pressure activated drain valve means interdicting said drain line for closing said drain line responsive to clutch application and opening said drain line except in response to clutch application;

separate vent line conduit means communicating between a portion of said cylinder subject to low relative pressure as a result of the pressure gradient created by centrifugal forces caused by rotation of said pressure plate and other clutch components when said clutch is released and the atmosphere; and pressure activated relief valve means controlling said vent line for closing said vent line responsive to internal pressures higher than atmospheric pressure and opening said vent line under other conditions, said relief valve means being designed to stop the flow of hydraulic fluid into said vent line, when closed, proximate said cylinder;

whereby pressurized hydraulic fluid injected into said cylinder to apply said clutch closes both said drain and relief valves means against pressure losses, a pressure drop in said cylinder resulting from closure of said apply valve will cause said drain valve means to open to discharge hydraulic fluid and a pressure drop to near atmospheric pressure will cause said relief valve means to open permitting entrance of atmospheric air to complete evacuation of hydraulic fluid from said cylinder; and said vent line, feed line, relief valve means, apply valve and cylinder are so located with respect to each other that gravitational forces will maintain hydraulic fluid in said feed line when said relief valve means is open.

* * * * *